United States Patent
Chapman et al.

(10) Patent No.: US 6,920,108 B1
(45) Date of Patent: Jul. 19, 2005

(54) METHOD AND APPARATUS FOR COLLISION AVOIDANCE IN BUFFERLESS NETWORKS

(75) Inventors: Alan S. Chapman, Kanata (CA); Jeffrey W. Fitchett, Kanata (CA)

(73) Assignee: Nortel Networks Limited, St-Laurent (CA)

( * ) Notice: Subject to any disclaimer, the term of this patent is extended or adjusted under 35 U.S.C. 154(b) by 715 days.

(21) Appl. No.: 09/603,354

(22) Filed: Jun. 26, 2000

(51) Int. Cl.[7] .......................... G06F 11/00; H04L 12/26
(52) U.S. Cl. ................... 370/230.1; 370/462; 370/509
(58) Field of Search ............................. 370/235, 237, 370/388, 422, 445, 448, 462, 509, 229, 230, 230.1, 236, 231, 443, 459; 398/98

(56) References Cited

U.S. PATENT DOCUMENTS

| | | | | |
|---|---|---|---|---|
| 5,459,719 A | * | 10/1995 | Hayashi | 370/236 |
| 5,683,359 A | * | 11/1997 | Farkas et al. | 604/22 |
| 5,852,601 A | * | 12/1998 | Newman et al. | 370/230 |
| 6,349,092 B1 | * | 2/2002 | Bisson et al. | 370/258 |
| 6,404,753 B1 | * | 6/2002 | Chien et al. | 370/337 |

* cited by examiner

Primary Examiner—Afsar Qureshi

(57) ABSTRACT

An apparatus for implementing a collision avoidance mechanism in a bufferless network. The apparatus includes first and second inputs for receiving traffic units from first and second source points, respectively. The traffic units from the first source point arrive at the first input on a basis of a first traffic pattern. The traffic units from the second source point arrive at the second input on a basis of a second traffic pattern. The apparatus further includes a traffic detection unit and a notification unit. The traffic detection unit is operative to monitor the traffic units received at the first and second inputs for detecting the first and second traffic patterns. The notification unit is operative to generate a control signal for transmission to either one of the first and second source points on a basis of the detected first and second traffic patterns. This control signal is directive to regulate at least in part the traffic pattern of the traffic units sent from either one of the first and second source points such that a possibility of collision is reduced.

53 Claims, 5 Drawing Sheets

|   | | | | | | | | | | | | | | | |
|---|---|---|---|---|---|---|---|---|---|---|---|---|---|---|---|
| 1 | F | 999 | 998 | 997 | 996 | 995 | 994 | ... | 4 | 3 | 2 | 1 | F | 999 | 998 | 997 |

0000000XXXXX1111111XXX

Figure 6

METHOD AND APPARATUS FOR COLLISION AVOIDANCE IN BUFFERLESS NETWORKS

FIELD OF THE INVENTION

The present invention relates to the field of data transmission. More specifically, it pertains to a method and apparatus for performing collision avoidance in bufferless networks, such as optical networks, multi-hop satellite networks and any network in which buffering of coincident arrivals or transient overloads is not practical or desirable.

BACKGROUND OF THE INVENTION

In electronic packet networks, packets are usually launched into the network without negotiation and, when competing streams of traffic meet at a congesting node, elastic buffering is used to handle the collision caused by the coincident arrivals of traffic for the same destination. Transmission protocols, such as the Transmission Control Protocol (TCP), are used to ensure that the average rate of traffic arriving at a switching node is not greater than the outgoing link capacity. Buffer fill in the switching nodes is usually used as the trigger for indicating congestion to those protocols.

In purely optical networks, elastic buffering of information is difficult, if not impossible, to implement and manage. Thus, once a unit of data is launched into the network, it must either follow its switched path through the network without hindrance or, if it collides with traffic from another source at some switching point, one or both units of data must be discarded. The same situation occurs in any other type of network in which buffering of coincident arrivals of traffic for the same destination, or of transient overloads, is not practical or desirable, for example multi-hop satellite networks.

Existing solutions to this dilemma include the application within the bufferless networks of statistical techniques that accept collision and loss but minimize collisions by randomizing the timing of traffic bursts. Unfortunately, such techniques are inefficient in bandwidth use.

Another solution is the implementation of a completely synchronized network such that all collisions are avoided. In a completely synchronized network, a sender can be allocated specific time intervals at which to send data. A signaling mechanism and/or centralized controller is needed to manage the allocation of timeslots, and clocking and framing have to be provided on a network wide basis. Unfortunately, the cost of such a solution is the complex requirement for network wide synchronization and a necessity to make slow changes of bandwidth allocation based on total knowledge of demand and resource.

The background information herein clearly shows that there exists a need in the industry to provide an improved method and apparatus for performing collision avoidance in a bufferless network.

SUMMARY OF THE INVENTION

The present invention is directed to an apparatus for implementing a collision avoidance mechanism in a bufferless network. The apparatus includes a first input for receiving traffic units sent from a first source point and a second input for receiving traffic units sent from a second source point. The traffic units sent from the first source point are characterized by a first traffic pattern, while the traffic units sent from the second source point are characterized by a second traffic pattern. The apparatus further includes a traffic detection unit and a notification unit. The traffic detection unit is operative to monitor the traffic units received at the first and second inputs in order to detect the traffic patterns in use by the respective source points. On a basis of the detected first and second traffic patterns, the notification unit is operative to generate a control signal for transmission to either one of the first and second source points. This control signal is directive to regulate at least in part the traffic pattern of the traffic units sent from either one of the first and second source points such that a possibility of collision between the traffic units from the first source point and the traffic units from the second source point is reduced.

Advantageously, the apparatus can be used to prevent collision within a bufferless network, such as an optical network or a multi-hop satellite network. In particular, the apparatus can provide intelligent recommendations to traffic senders such that traffic collisions are avoided and loss of traffic is reduced significantly or completely eliminated within a bufferless network.

The traffic units in the bufferless network may be either user data units, control units or compound units having a user data part and a control part. The user data units and the user data parts of the compound units carry mostly user payload data, such as speech samples, video samples or other. The control units and control parts of the compound units carry control information, such as source and destination identifiers and control sequence numbers. In a specific example, the traffic units that the traffic detection unit monitors in order to detect the traffic patterns in use by the source points are control units.

According to a non-limiting example of implementation of the present invention, the apparatus is implemented in a switching node in an optical network. The optical network is managed as a mesh of trunks, where a trunk defines a virtual path originating at one edge node of the network and terminating at another edge node of the network. Each trunk is built from a set of timeslots that is managed as a cohesive unit, user data units being sent on a particular trunk according to a particular frame pattern. A frame is formed of a sequence of timeslots, the frame pattern being defined by the allocation of user data units to the frame timeslots. Each frame timeslot containing user data is accompanied by a control unit that contains source and destination information and any other required information, such as data length. In particular, each control unit includes data indicative of the sequence number assigned to the associated timeslot.

The switching node includes a controller responsible for implementing a collision avoidance mechanism. The controller includes two functional sub-controller blocks, notably a traffic detection unit and a notification unit. The traffic detection unit is responsible for observing incoming control units to detect the frame patterns in use by different source points. Where the traffic units from a source point are to be forwarded over a particular output communication link of the switching node, the detection unit maps in a data structure the source point frame patterns to the local frame pattern associated with the particular output communication link.

The notification unit generates, on a basis of the contents of the data structure, a control signal that is sent to the source points, the control signal being directive to change the source point sending behavior such that the likelihood of collisions and loss of traffic will be reduced. Examples of such changes to the source point sending behavior include changes to the frame pattern, changes to the time reference of the data transmissions and a reduction in the rate of data transmission, among others.

In a specific non-limiting example, the control signal sent to a source point includes a timeslot allocation vector that provides a status indication for every timeslot of the local frame pattern for a particular output communication. Examples of such status indication include: Allocated, No Allocated and Soon To Be Allocated. The source point uses this allocation information to determine which timeslots of the output communication link it is able to use for data transmission. The timeslot allocation vector may also include a weighting factor for each timeslot indicative of a preference rating for the timeslot, wherein certain timeslots of the output link are preferred for use by the source point than others.

According to a variant example of implementation, the switching node further includes a mechanism for managing congestion, where congestion in a bufferless network is defined as being when a source point has more traffic to send than is currently allocated for by the network. In a specific example, the switching node controller includes a third functional sub-controller block, notably a dynamic timeslot allocation controller. The dynamic timeslot allocation controller is responsible for dynamically allocating output communication link bandwidth capacity to the plurality of trunks passing through the output communication links of the switching node, such that the effects of congestion are spread fairly, or according to some policy, over those trunks. Specifically, for a particular output communication link, the dynamic timeslot allocation controller dynamically distributes timeslots of the local frame pattern for the particular output communication link between the traffic received from various source points, on a basis of the frame patterns in use by the various source points. It also reserves timeslots of the frame pattern needed to allow the switching node to reconfigure as well as to avoid the collision of data arriving from two source points whose timeslots are not properly aligned.

According to a variant example of implementation, the above-described dynamic timeslot allocation controller is implemented by a remote controller to which the switching node reports, along with a plurality of other such switching nodes within the network. In particular, the processing unit of the switching node observes incoming control units to detect the frame patterns in use by different trunks, and reports to the remote controller the mapping of every detected frame pattern to the local frame pattern associated with the particular output communication link to be used by the trunks. The remote controller processes the mappings reported by the plurality of switching nodes within the network, on the basis of which mappings the remote controller performs a network-wide dynamic timeslot allocation operations. The remote controller generates and sends to each switching node a control signal indicative of the output link timeslot allocations to be implemented by the switching node.

The present invention is also directed to a bufferless network formed of a plurality of data transmission nodes, where each data transmission node includes a traffic detection unit and a notification unit as described above. In particular, the control signal that is generated by the notification unit of a particular data transmission node and sent to a particular source point is modifiable by other data transmission nodes located along a communication path established between the particular data transmission node and the particular source point. Thus, the other data transmission nodes located along the communication path may contribute to the control signal for regulating at least in part the traffic pattern of the traffic units sent from the particular source point, such that collisions at these other data transmission nodes are also avoided.

The present invention also encompasses a method for preventing collisions between traffic units sent from a first source point and traffic units sent from a second source point at a data transmission node in a bufferless network.

BRIEF DESCRIPTION OF THE DRAWINGS

These and other features of the present invention will become apparent from the following detailed description, considered in connection with the accompanying drawings. It is to be understood, however, that the drawings are provided for purposes of illustration only and not as a definition of the boundaries of the invention, for which reference should be made to the appending claims.

FIG. 4 illustrates an example of a timeslot frame;

FIG. 5 illustrates an example of frame mapping;

FIG. 6 illustrates an example of a timeslot allocation vector;

DETAILED DESCRIPTION

Figure 1:
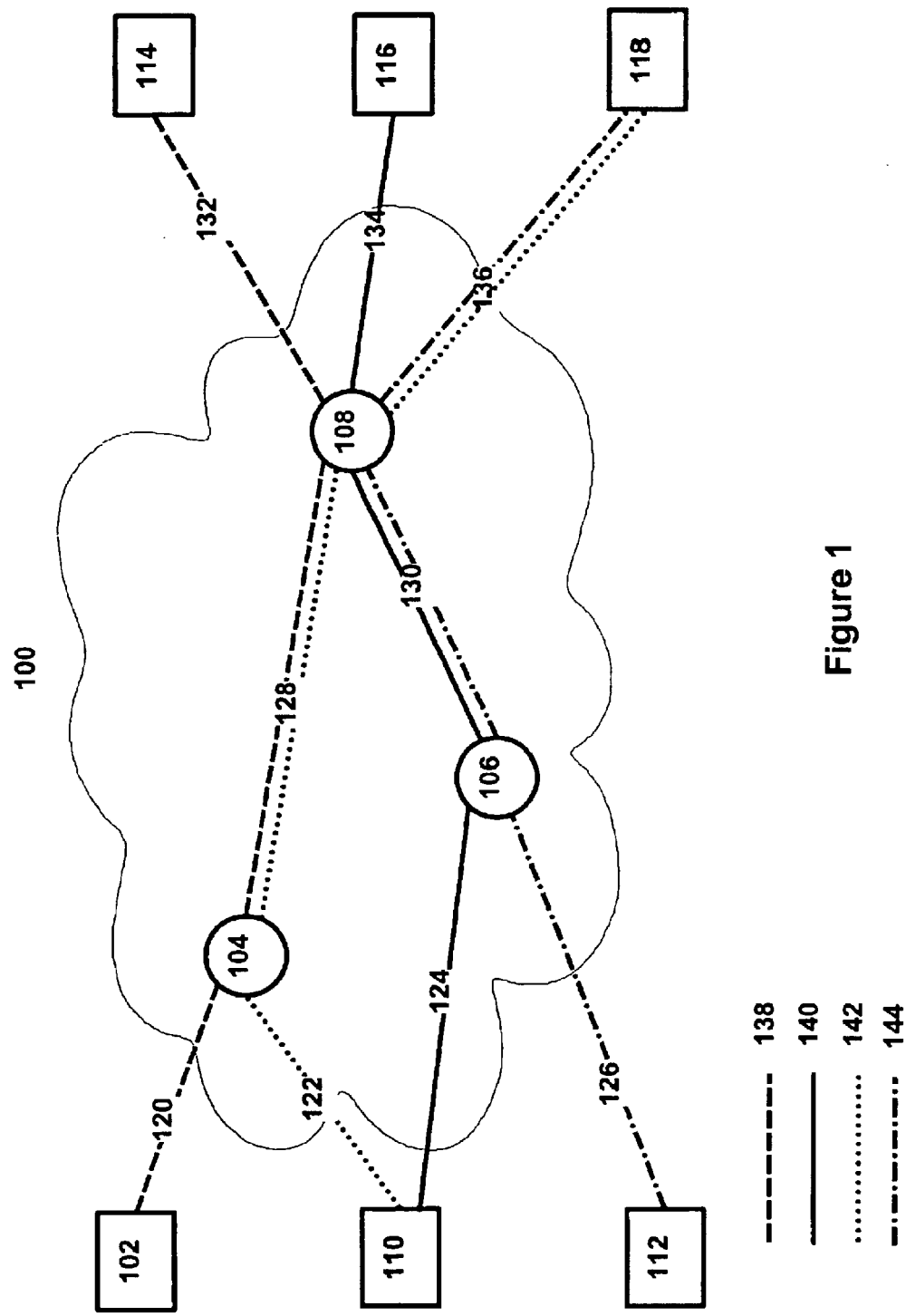
FIG. 1 depicts an example of an optical network.

FIG. 1 illustrates an example of an optical network 100 formed of edge nodes 102, 110, 112, 114, 116, 118 and switching nodes 104, 106, 108, interconnected by physical communication links 120, 122, 124, 126, 128, 130, 132. 134, 136. An edge node receives and buffers data in the electrical domain, converts the data to the optical domain and launches data into the optical network 100 under the control of a sending policy. In the reverse direction, an edge node receives data from the optical network 100, converts it back to the electrical domain and forwards it into the electrical network.

The switching nodes 104, 106 and 108 are optical space switches responsible for delivering the data to the correct destination within the optical network 100.

The optical network 100 is managed as a mesh of trunks 138, 140, 142 and 144. Trunks are virtual circuits built from a set of timeslots that is managed as a cohesive unit, originating at one edge node and terminating at another edge node. Note that the optical network 100 may also support multicast trunks. An edge node may originate and terminate many trunks and manages the allocation of the total bandwidth between the trunks as well as the time pattern of sending data units on each particular trunk.

The data flowing through the optical network 100 is hereinafter referred to as "traffic units". These traffic units may be either used data units, control units or compound units having a user data part and a control part. The user data units and the user data parts of the compound units carry mostly user payload data, such as speech samples, video samples or other. The control units and control parts of the compound units carry control information, such as source and destination identifiers and control sequence numbers. In a specific example, the traffic units that the traffic detection unit monitors in order to detect the traffic patterns in use by the source points are control units.

Figure 2:
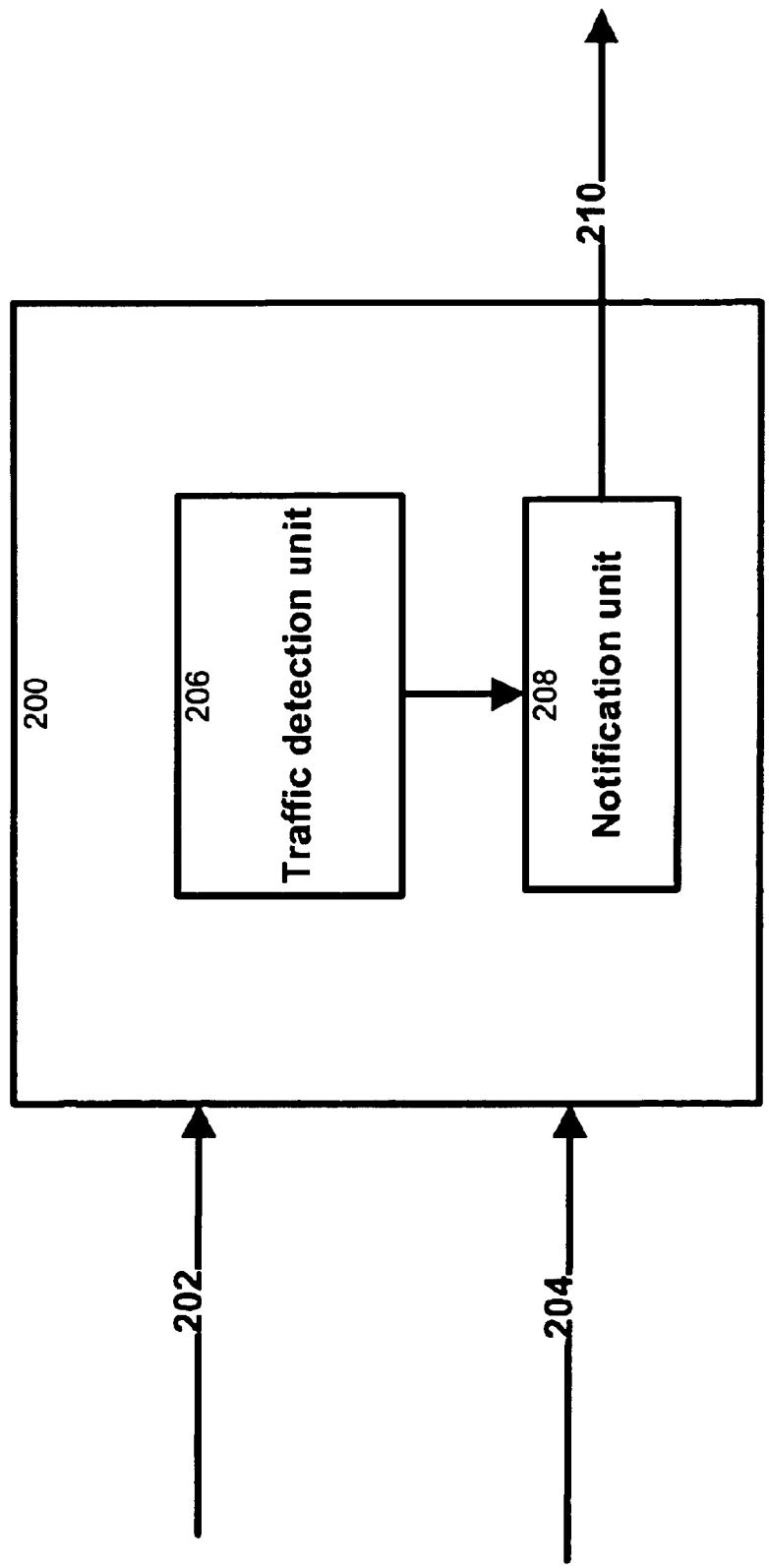
FIG. 2 is a functional block diagram of an apparatus implementing a bufferless collision management mechanism, in accordance with an example of implementation of the present invention.

Specific to the present invention, the optical network 100 includes an apparatus for implementing a bufferless collision avoidance mechanism, shown functionally in FIG. 2. The apparatus 200 includes a first input 202 for receiving traffic units sent from a first source point and a second input 204 for receiving traffic units sent from a second source point. The traffic units received from the first source point are characterized by a first traffic pattern, while the traffic units received from the second source point are characterized by a second traffic pattern, as will be discussed in further detail below.

The apparatus 200 further includes a traffic detection unit 206 and a notification unit 208. The traffic detection unit 206 monitors the traffic units received at the first and second inputs 202, 204 in order to detect the traffic patterns in use by the respective source points. On a basis of the first and second traffic patterns detected by the traffic detection unit, the notification unit 208 generates a control signal for transmission to either one of the first and second source point via output 210. This control signal is directive to regulate the traffic pattern of the traffic units sent from either one of the first and second source points, such that a collision between the traffic units from the first source point and the traffic units from the second source point is avoided.

Figures 4, 5, 6:
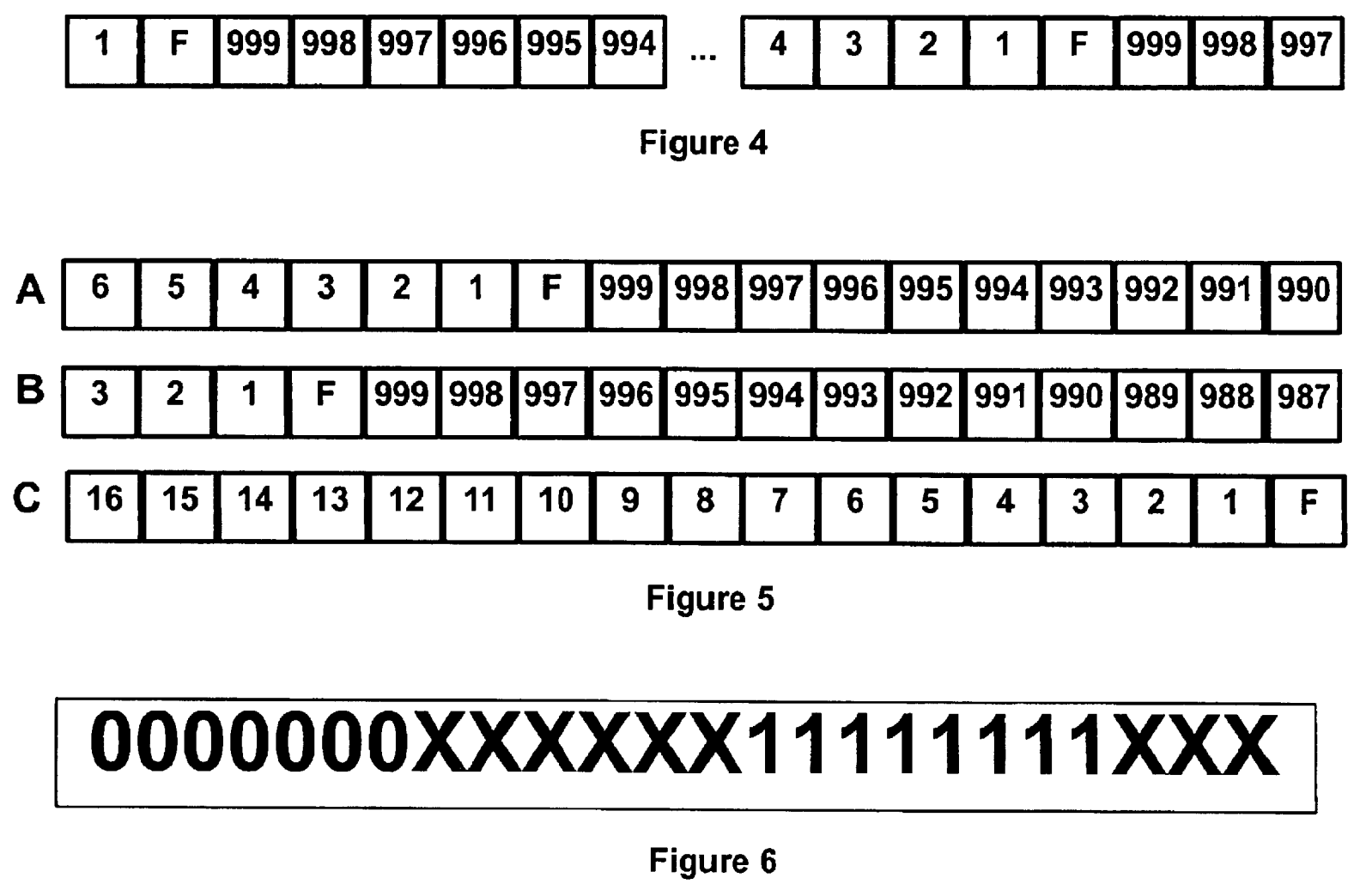

In a specific non-limiting example of implementation, transmission within the optical network 100 is frame-based, where the traffic patterns monitored by the traffic detection unit are in effect frame patterns. More particularly, an edge node logically divides its access bandwidth (typically the capacity of one wavelength) into a number of fixed-size timeslots that may be used for sending data into the network. The edge node assigns a sequence identifier to each timeslot and the numbering repeats after some framing interval, the allocation of user data units to the frame timeslots defining a particular frame pattern. An example of a frame of 1000 timeslots is shown in FIG. 4. The frame for a particular edge node is independent of any other edge nodes within the optical network 100. Thus, any timeslot in a frame is identified by its position in the frame, but that frame has no synchronism with other edge nodes. Each frame timeslot containing user data is accompanied by a control unit that contains source and destination information and any other required information, such as data length. In particular, each control unit includes data indicative of the sequence number assigned to the associated timeslot.

For each timeslot received by a switching node within the optical network 100, the switching node is operative to convert the timeslot control unit to its electrical representation and use the recovered information to set the space switch crosspoints correctly for the data. The actual data contained in the timeslot remains in the optical domain. The control unit must precede the user data by at least the time required for the switching node to reconfigure the optical crosspoint in order to deliver the user data to the correct egress port for the particular destination. This time slew can be provided by the source points, by delay lines at the switching nodes, or by some combination of these two.

Figure 3:
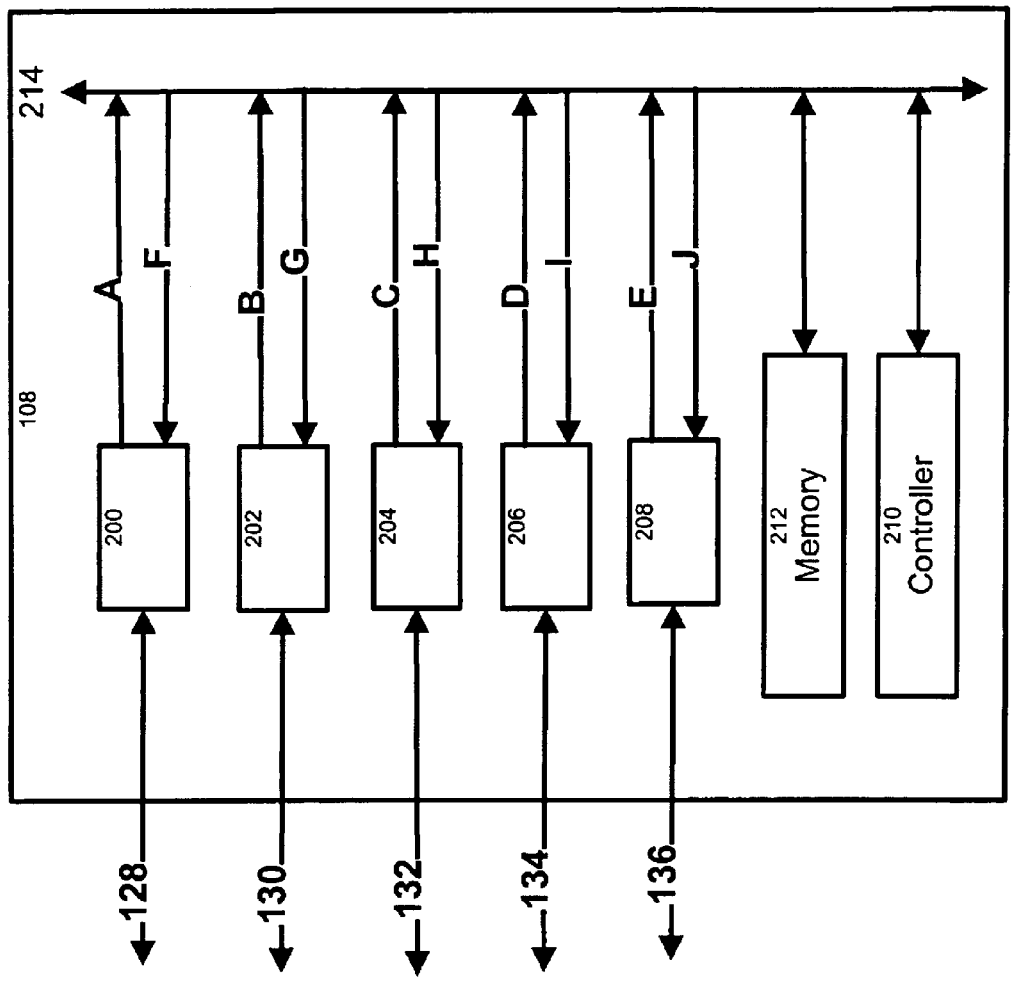
FIG. 3 is a structural block diagram of a switching node from the optical network shown in FIG. 1.

In this specific non-limiting example of implementation, the apparatus 200 is implemented in each of the switching nodes 104, 106 and 108. The general structure of these switching nodes is shown in FIG. 3, taking the example of switching node 108. Switching node 108 is implemented on what is referred to as a switch card, the card comprised of interfaces 200, 202, 204, 206 and 208, a controller 210 and a memory 212. An internal system bus 214 interconnects these components, enabling data and control signals to be exchanged between them. The switching node has 10 ports, identified as ports A through output ports F and G, connect the switching node 108 to physical communication links 128 and 130, allowing data to be received from and passed to adjacent switching nodes 104 and 106, respectively. The remaining input ports C, D, E and output ports H, I, J connect the switching node 108 to physical communication links 132, 134 and 136, allowing data to be received from and passed to adjacent edge nodes 114, 116 and 118, respectively. In general, the input ports are designed to receive data from their associated physical paths, while the output ports are designed to transmit data over their associated physical paths.

Note that the switching node 108 assigns to each of the communication links 128, 130, 132, 134 and 136 a local frame pattern, based on which traffic units are transmitted over these links from the switching node 108 to the adjacent switching nodes and edge nodes.

The interfaces 200, 202, 204, 206 and 208 interconnect the various input and output ports to their respective physical communication paths. These interfaces are responsible for the conversion of incoming optical signals into electrical signals, as well as for the transmission of these electrical signals to the internal system bus 214 for transport to the memory 212 where they can be processed by the controller 210. On the output side, the interfaces are also designed to accept outgoing electrical signals from the memory 212 through the system bus 214, and convert these electrical signals into optical signals prior to their release into the optical network. It is not deemed necessary to discuss the standard transmission and signal conversion operations of the interfaces in more detail because it is well known to those skilled in the art and is not critical to the success of the invention.

The memory 212 contains a program element that controls the operation of the switching node 108. This program element is comprised of individual instructions that are executed by the controller 210 that is in the form of a Central Processing Unit (CPU). The memory 212 further holds a routing table that maps the destination addresses of incoming traffic units to the switching node 108 output ports. It is not deemed necessary to further discuss the structure of the routing table here because this component is not critical to the success of the invention and also it would be well known to a person skilled in the technological field to which the present invention belongs. In addition, the memory 212 provides random access storage, capable of holding data elements that the controller 210 manipulates during the execution of the program. The execution of the program element by the controller ensures standard data transmission, including the multiplexing and de-multiplexing of optical signals. Such functionality is well-known to those skilled in the art and therefore will not be described in more detail.

Specific to the present invention, the execution of the program element stored in the memory of switching node 108 further implements the bufferless collision avoidance mechanism introduced above. The operation of this particular functionality of the program element will be described in further detail below. The above structural description of a switching node has the purpose of presenting certain components of such a transmission node, and is in no way intended to limit the scope of the present invention to just these components.

Although traffic units are sent in both directions within the optical network 100, that is from edge nodes 102, 110, 112 to edge nodes 114, 116, 118 as well as from edge nodes 114, 116, 118 to edge nodes 102, 110, 112, for the sake of clarity it is assumed hereinafter that traffic units are only transmitted in the direction from edge nodes 102, 110, 112 to edge nodes 114, 116, 118.

The controller 210 includes two functional sub-controller blocks, specifically the traffic detection unit and the notification unit. The traffic detection unit is responsible within the switching node 108 for monitoring the traffic units received from adjacent switching nodes 104, 106 over physical communication links 128, 130, respectively, in order to determine the different frame patterns in use by the various trunks 138, 140, 142, 144. In a specific example, the traffic detection unit determines the frame pattern in use by a trunk on the basis of one or more timeslot control units, where each control unit indicates the sequence identifier associated with a particular frame timeslot.

For each of the output communication links 132, 134 and 136, the traffic detection unit stores in a data structure in the memory 212 a mapping between the local frame pattern for the particular output communication link and the frame pattern observed for each trunk using the particular output communication link. As shown by the example of FIG. 5, when trunks A and B are both using a communication link C, the mapping stored in a data structure in memory 212 maps frame patterns A and B to local frame pattern C. Thus, we see for example that timeslot 1 of frame pattern A and timeslot 998 of frame pattern B both correspond to timeslot 11 of the local frame pattern C. This mapping of the timeslot sequence identifiers for frame patterns A and B to the local frame pattern C provides a method of communication between the switching node 108 and the source point(s) of trunks A and B, as will be described in further detail below. The traffic detection functionality is implemented as software, specifically a part of the program element stored in the memory of the switching node 108.

Note that a lack of synchronisation in the sending behaviour over trunks A and B can result in an overlap between a timeslot of frame pattern A and a timeslot of frame pattern B, with respect to a particular timeslot of frame pattern C. Such an overlap represents a potentially impending collision between the data units of trunks A and B.

In a specific example, we see in FIG. 1 that, for trunk 142, traffic units are sent from edge node 110, a first source point, to switching node 108 over physical communication links 112 and 128. For trunk 144 traffic units are sent from edge node 112, a second source point, to switching node 108 over physical communication links 126 and 130. Both trunks 142, 144, and thus all traffic units being sent on these trunks, are output from switching node 108 over physical communication link 136. The traffic detection unit of switching node 108 is thus operative to detect the frame patterns for both incoming trunks 142, 144 and map these frame patterns to the local frame pattern for the output communication link 136, storing the map in the data structure of memory 212.

The notification unit is responsible within the switching node 108 for generating a control signal for transmission to any one of edge nodes 102, 110, 112 (source points), on a basis of the frame patterns detected by the traffic detection unit. Specifically, once the traffic detection unit has stored in the data structure of the memory 212 the mapping between the local frame pattern for a particular output communication link and the frame pattern observed for each trunk using the particular output communication link, the notification unit is able to communicate with the trunk source point(s) on a basis of this mapping. Thus, the notification unit generates and sends to a particular source point a control signal that is directive to change the source point sending behaviour such that collisions are avoided. Examples of such changes in the source point sending behaviour include changes to the frame pattern, changes to the time reference of the data transmissions and a reduction in the rate of data transmission, among other possibilities. Similar to the traffic detection unit, the notification unit functionality is implemented as software, specifically a part of the program element stored in the memory of the switching node 108.

The method of communication provided by the frame pattern mapping is shown in the example of FIG. 5, where frame patterns A and B for trunks A and B, respectively, are mapped to local frame pattern C. Assume that the control signal generated by the notification unit is to be sent to the source point of trunk A and that the notification unit wants to advise the source point of trunk A that timeslot 11 of the local frame pattern C is allocated for use by another trunk. On a basis of the mapping, timeslot 11 of frame pattern C corresponds to timeslot 1 of frame pattern A. Thus, the control signal generated by the notification unit will include an indication that timeslot 1 of frame pattern A is not available for sending user data over trunk A.

The control signal that is generated by the notification unit of the switching node 108 and sent to a particular source point is susceptible to be intercepted by intermediate switching nodes located along the trunk established between the switching node 108 and the particular source point, where each intermediate switching node has assigned to each of its own output communication links a local frame pattern. Upon interception by such an intermediate switching node, the control signal is modifiable by the intermediate switching node. In particular, the control signal may be processed at the intermediate switching node and updated such that, in addition to being directive to change the source point sending behavior such that collisions are avoided at switching node 108, it is further directive to change the source point sending behavior such that collisions are avoided at the intermediate switching node as well. The intermediate switching node updates the control signal on the basis of its own mapping of trunk frame patterns to a local frame pattern.

In a non-limiting example of implementation, the control signal is generated by a switching node having an output communication link that is directly connected to an edge node at the receiving end of a particular trunk. The control signal travels back along the communication path of the trunk to the trunk source point, through all switching nodes located on that path. The control signal includes a timeslot allocation vector that provides a status indication for every timeslot of the local frame pattern for a particular trunk. An example of a timeslot allocation vector is shown in FIG. 6, where the timeslot allocation vector is formed of a sequence of codes, each code being associated with a particular frame timeslot. In this example, the code may assume one of three values: 0 (Not Allocated), 1 (Allocated) or X (Soon To Be Allocated). All switching nodes on the trunk contribute to the final timeslot allocation vector received at the trunk source point. The source point that receives the timeslot allocation vector may use the allocation information contained therein to determine which timeslots of the frame for the particular trunk it is able to use for user data transmission.

Note that the timeslot allocation vector may also include a weighting factor for each timeslot indicative of a preference rating for the timeslot, where certain timeslots of a trunk are preferred for use by a source point than others.

Continuing with the above specific example of traffic units sent from edge nodes 110, 112 over trunks 142, 144, respectively, assume the traffic detection unit has detected the frame patterns in use by trunks 142, 144, and has mapped these frame patterns to the local frame pattern for physical communication link 136 in the data structure of memory 212. On a basis of this mapping, the notification unit of switching node 108 generates a control signal for transmission to either one of edge nodes 110 and 112. Assuming the control signal is generated for edge node 112, the control signal includes a timeslot allocation vector that indicates to edge node 112 the status for every timeslot of the local frame pattern for communication link 136, indexed on the basis of the mapping between the frame pattern detected for trunk 144 and the local frame pattern for communication link 136. The edge node 112 will modify its own sending behaviour on the basis of this control signal.

The control signal is sent from switching node 108 to intermediate switching node 106, for forwarding to edge node 112. The switching node 106 updates the control signal based on its own timeslot availability, for example adding to or modifying the timeslot allocation vector with information indicative of the status for each timeslot of the local frame pattern for the output communication link 130, prior to passing the control signal to the edge node 112 over communication link 126.

Figure 7:
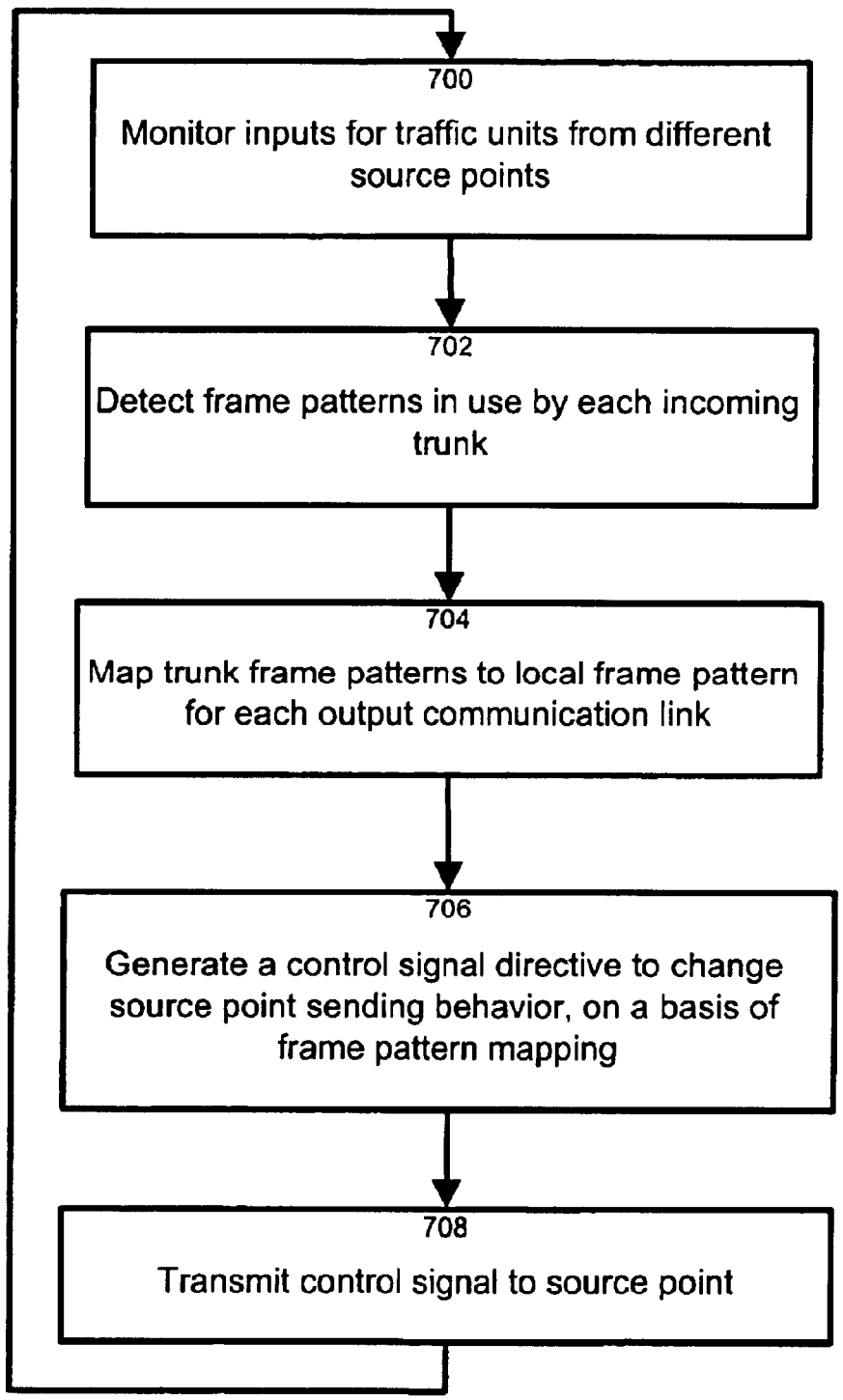
FIG. 7 is a flowchart illustrating the operation of a program element in the switching node depicted in FIGS. 1 and 3, which controls the bufferless collision avoidance mechanism.

FIG. 7 provides a complete flowchart illustrating an example of the operation of the program element stored in the memory 212, and executed by the controller 210, that regulates the operation of the switching node 108, in particular the collision avoidance functionality implemented by the traffic detection unit and the notification unit. At step 700, the traffic units arriving at the inputs to switching node 108 from different source points within the optical network 100 are monitored. At step 702, the frame patterns in use by each distinct trunk within the network 100 are detected. Next, for a particular output communication link of the switching node 108, the frame patterns of the trunks using the particular output communication link are mapped to the local frame pattern assigned by the switching node 108 to the particular output communication link, at step 704. This mapping is stored in a data structure in the memory 212 of the switching node 108. At step 706, a control signal is generated for transmission to the originating edge node of one of the trunks using the particular output communication link, on the basis of the mapping of trunk frame patterns to local frame pattern for the particular output communication link. This control signal is sent to the edge node at step 708, directive to change the sending behaviour of the edge node such that a collision is avoided.

In an alternative example of implementation, the switching node 108 further includes a mechanism for avoiding congestion, where congestion in a bufferless network is defined as being when a source point has more traffic to send than is currently allocated for by the network. In a specific example, the controller 210 of the switching node 108 includes a third functional sub-controller block, notably a dynamic timeslot allocation controller. The dynamic timeslot allocation controller is operative to dynamically allocate the bandwidth capacity of each output communication link of the switching node 108 to the plurality of trunks passing through these output communication links, such that congestion is properly managed. In this example, the dynamic timeslot allocation controller functionality is also implemented as software, a part of the program element stored in the memory of the switching node 108.

In particular, for a particular output communication link, the dynamic timeslot allocation controller dynamically distributes timeslots of the local frame pattern for the particular output communication link between the traffic received from various source points, on a basis of the frame patterns in use by the various source points. When free timeslots of the local frame pattern for the particular output communication link are available, the portion of timeslots that is allocated by the dynamic timeslot allocation controller for traffic received from a particular source point is greater than the portion of timeslots currently being used by the traffic received from the particular source point. The approach is that, when possible, every trunk passing through the particular output communication link will be allocated more timeslots than it is currently using. If the portion of timeslots currently being used by a particular trunk increases, the dynamic timeslot allocation controller will allocate more timeslots to the particular trunk, as long as more timeslots are available and the increased allocation does not violate any sharing policies that are in place within the network. If the portion of timeslots currently being used by a particular trunk decreases, the dynamic timeslot allocation controller will remove some allocation, but will still leave room for an increase in the portion of timeslots used by the trunk.

Note that the dynamic timeslot allocation controller unit may also reserve timeslots of the frame pattern needed to allow the switching node 108 to reconfigure or to avoid the collision of traffic units arriving from two source points whose timeslots are not properly aligned.

In yet another non-limiting example of implementation, the above-described dynamic timeslot allocation controller is implemented by a remote controller to which the switching node 108 reports, along with the other such switching nodes 104, 106 within the optical network 100. In particular, the traffic detection unit of the switching node 108 observes incoming traffic units to detect the frame patterns in use by different source points and reports to the remote controller the mapping of every detected source point frame pattern to the local frame pattern associated with the particular output communication link to be used by the traffic units. The remote controller processes the mappings reported by switching nodes 104, 106 and 108, on the basis of which mappings the remote controller performs a network-wide dynamic timeslot allocation operation. The remote controller generates and sends to each particular switching node a control signal indicative of the output link timeslot allocations to be implemented by the particular switching node.

The above description of a preferred embodiment under the present invention should not be read in a limitative manner as refinements and variations are possible without departing from the spirit of the invention. The scope of the invention is defined in the appended claims and their equivalents.

We claim:

1. An apparatus for use in a bufferless network comprising:
    a traffic detection unit coupled to said first and second inputs, said traffic detection unit operative to monitor the traffic units received at said first and second inputs for detecting said first and second traffic patterns;
    a notification unit for generating a control signal for transmission to either one of the first and second source points on a basis of the first and second traffic patterns detected by said traffic detection unit, said control signal being directive to regulate at least in part the traffic pattern of the traffic units sent from either one of the first and second source points such that a possibility of collision between the traffic units sent from the first source point and the traffic units sent from the second source point is reduced.

2. An apparatus as defined in claim 1, wherein said traffic units are selected from the group consisting of user data units, control units and compound units including a user data part and a control part.

3. An apparatus as defined in claim 2, wherein said first and second traffic patterns are first and second frame patterns respectively, a frame including a plurality of timeslots in which user data units are sent, each timeslot being associated with a unique sequence identifier.

4. An apparatus as defined in claim 3, wherein each timeslot is associated with a control unit including data indicative of the sequence identifier for the timeslot.

5. An apparatus as defined in claim 4, wherein the control unit further includes data indicative of the source and destination points for user data units contained in the timeslot.

6. An apparatus as defined in claim 5, wherein said traffic detection unit is operative to detect said first frame pattern on a basis of a control unit received from said first source point at said first input.

7. An apparatus as defined in claim 6, wherein said traffic detection unit is operative to detect said second frame pattern on a basis of a control unit received from said second source point at said second input.

8. An apparatus as defined in claim 7, wherein said apparatus includes an output communication link for forwarding traffic units received at said first and second inputs to a particular destination point, said apparatus transmitting traffic units over said output communication link on a basis of a local frame pattern.

9. An apparatus as defined in claim 8, wherein said traffic detection unit includes a machine readable storage medium holding a data structure, said traffic detection unit being operative to map each one of said first and second frame patterns to the local frame pattern and store the maps in said data structure.

10. An apparatus as defined in claim 8, wherein said apparatus further includes a dynamic timeslot allocation controller, said dynamic timeslot allocation controller operative to dynamically distribute timeslots of the local frame pattern for said output communication link between the traffic received at said first and second inputs on a basis of said first and second frame patterns.

11. An apparatus as defined in claim 10, wherein if free timeslots of the local frame pattern for said output communication link are available, the portion of timeslots that is allocated by said dynamic timeslot allocation controller for traffic received at said first or second input is greater than the portion of timeslots currently being used by the traffic received at said first or second input respectively.

12. An apparatus as defined in claim 9, wherein the notification unit is operative to generate the control signal on a basis of the contents of said data structure.

13. An apparatus as defined in claim 12, wherein the control signal generated by said notification unit conveys a timeslot allocation vector that provides a status indication for each timeslot of the local frame pattern for said output communication link.

14. An apparatus as defined in claim 13, wherein if the control signal is being sent to said first source point, the timeslot allocation vector is indexed on a basis of the mapping between said first frame pattern and the local frame pattern.

15. An apparatus as defined in claim 13, wherein if the control signal is being sent to said second source point, the timeslot allocation vector is indexed on a basis of the mapping between said second frame pattern and the local frame pattern.

16. An apparatus as defined in claim 13, wherein said timeslot allocation vector includes a weighting factor for each timeslot of the local frame pattern for said output communication link, the weighting factor associated with a particular timeslot indicative of a preference rating for the particular timeslot.

17. An apparatus as defined in claim 1, wherein said apparatus is a switching node in an optical network.

18. An apparatus as defined in claim 1, wherein said apparatus is a transmission node in a multi-hop satellite network.

19. A method for preventing collision between traffic units sent from a first source point and traffic units sent from a second source point at a transmission node in a bufferless network, the traffic units from the first source point being characterized by a first traffic pattern, the traffic units from the second source point being characterized by a second traffic pattern, said method comprising:

generating a control signal for transmission to either one of the first and second source points on a basis of the detected first and second traffic patterns, said control signal being directive to regulate at least in part the traffic pattern of the traffic units sent from either one of the first and second source points such that a possibility of collision between the traffic units sent from the first source point and the traffic units sent from the second source point is reduced.

20. A method as defined in claim 19, wherein the traffic units are selected from the group consisting of user data units, control units and compound units including a user data part and a control part.

21. A method as defined in claim 20, wherein the first and second traffic patterns are first and second frame patterns respectively, a frame including a plurality of timeslots in which user data units are sent, each timeslot being associated with a unique sequence identifier.

22. A method as defined in claim 21, wherein each timeslot is associated with a control unit including data indicative of the sequence identifier for the timeslot.

23. A method as defined in claim 22, wherein each control unit further includes data indicative of the source and destination points for user data units contained in the particular frame timeslot.

24. A method as defined in claim 23, wherein the transmission node includes an output communication link for forwarding traffic units to a particular destination point, the transmission node operative to transmit traffic units over the output communication link on a basis of a local frame pattern.

25. A method as defined in claim 24, said method comprising the step of mapping each one of said first and second frame patterns to the local frame pattern, the control signal being generated on a basis of this mapping.

26. A method as defined in claim 25, wherein said control signal includes a timeslot allocation vector that provides a status indication for each timeslot of the local frame pattern for the output link.

27. A method as defined in claim 26, wherein if the control signal is being sent to the first source point, the timeslot allocation vector is indexed on a basis of the mapping between the first frame pattern and the local frame pattern.

28. A method as defined in claim 26, wherein if the control signal is being sent to the second source point, the timeslot allocation vector is indexed on a basis of the mapping between the second frame pattern and the local frame pattern.

29. A method as defined in claim 26, wherein the timeslot allocation vector includes a weighting factor for each timeslot of the local frame pattern for the output link, the weighting factor associated with a particular timeslot indicative of a preference rating for the particular timeslot.

30. A method as defined in claim 29, further comprising the step of dynamically distributing timeslots of the local frame pattern for the output communication link between the traffic received from the first and second source points on a basis of the first and second frame patterns.

31. A method as defined in claim 30, wherein if free timeslots of the local frame pattern for the output communication link are available, the portion of timeslots that is allocated for traffic received from either one of the first and second source points is greater than the portion of timeslots currently being used by the traffic received from either one of the first and second source points, respectively.

32. A bufferless network formed of a plurality of transmission nodes, each one of said plurality of transmission nodes comprising:
a traffic detection unit coupled to said first and second inputs, said traffic detection unit operative to monitor the traffic units received at said first and second inputs for detecting said first and second traffic patterns;
a notification unit for generating a control signal for transmission to either one of the first and second source points on a basis of the first and second traffic patterns detected by said traffic detection unit, said control signal being directive to regulate at least in part the traffic pattern of the traffic units sent from either one of the first and second source points such that a possibility of collision at the transmission node between the traffic units sent from the first source point and the traffic units sent from the second source point is reduced.

33. A network as defined in claim 32, wherein the control signal that is generated by a particular transmission node and sent to a particular source point is updateable by other transmission nodes located along a communication path established between the particular transmission node and the particular source point, for regulating at least in part the traffic pattern of the traffic units sent from the particular source point such that the possibility of collision at the other transmission nodes located along the communication path is reduced.

34. A network as defined in claim 33, wherein said network is an optical network.

35. A network as defined in claim 33, wherein said network is a multi-hop satellite network.

36. A network as defined in claim 34, wherein said transmission nodes are switching nodes.

37. A computer readable storage medium containing a program element for execution by a computing apparatus to implement a device said device including:
a traffic detection unit operative to monitor the traffic units sent from the first and second source points for detecting the first and second traffic patterns;
a notification unit for generating a control signal for transmission to either one of the first and second source points on a basis of the first and second traffic patterns detected by said traffic detection unit, said control signal being directive to regulate at least in part the traffic pattern of the traffic units sent from either one of the first and second source points such that a possibility of collision between the traffic units sent from the first source point and the traffic units sent from the second source point is reduced.

38. A computer readable storage medium as defined in claim 37, wherein the traffic units are selected from the group consisting of user data units, control units and compound units including a user data part and a control part.

39. A computer readable storage medium as defined in claim 38, wherein the first and second traffic patterns are first and second frame patterns respectively, a frame including a plurality of timeslots in which user data units are sent, each timeslot being associated with a unique sequence identifier.

40. A computer readable storage medium as defined in claim 39, wherein each timeslot is associated with a control unit including data indicative of the sequence identifier for the timeslot.

41. A computer readable storage medium as defined in claim 40, wherein each control unit further includes data indicative of the source and destination points for user data units contained in the particular frame timeslots.

42. A computer readable storage medium as defined in claim 41, wherein said device is operative to transmit traffic units to a particular destination point over an output communication link on a basis of a local frame pattern.

43. A computer readable storage medium as defined in claim 42, wherein said traffic detection unit includes a machine readable storage medium holding a data structure, said traffic detection unit being operative to map each one of said first and second frame patterns to the local frame pattern and store the maps in said data structure.

44. A computer readable storage medium as defined in claim 43, wherein the notification unit is operative to generate the control signal on a basis of the contents of said data structure.

45. A computer readable storage medium as defined in claim 44, wherein the control signal generated by said notification unit conveys a timeslot allocation vector that provides a status indication for each timeslot of the local frame pattern for said output communication link.

46. A computer readable storage medium as defined in claim 45, wherein if the control signal is being sent to the first source point, the timeslot allocation vector is indexed on a basis of the mapping between the first frame pattern and the local frame pattern.

47. A computer readable storage medium as defined in claim 45, wherein if the control signal is being sent to the second source point, the timeslot allocation vector is indexed on a basis of the mapping between the second frame pattern and the local frame pattern.

48. A computer readable storage medium as defined in claim 47, wherein the timeslot allocation vector includes a weighting factor for each timeslot of the local frame pattern for said output communication link, the weighting factor associated with a particular timeslot indicative of a preference rating for the particular timeslot.

49. A computer readable storage medium as defined in claim 48, wherein said device further includes a dynamic timeslot allocation controller operative to dynamically distribute timeslots of the local frame pattern for said output communication link between the traffic received from the first and second source points on a basis of the first and second frame patterns.

50. A computer readable storage medium as defined in claim 49, wherein if free timeslots of the local frame pattern for said output communication link are available, the portion of timeslots that is allocated by said dynamic timeslot allocation controller for traffic received from the first or second source point is greater than the portion of timeslots currently being used by the traffic received from the first or second source point respectively.

51. A computer readable storage medium as defined in claim 50, wherein said device is a switching node in an optical network.

52. A computer readable storage medium as defined in claim 51, wherein said device is a transmission node in a multi-hop satellite network.

53. An apparatus for use in a bufferless network comprising:

traffic detection means coupled to said first and second input means, said traffic detection means operative to monitor the traffic units received at said first and second input means for detecting said first and second traffic patterns;

notification means for generating a control signal for transmission to either one of the first and second source points on a basis of the first and second traffic patterns detected by said traffic detection means, said control signal being directive to regulate at least in part the traffic pattern of the traffic units sent from either one of the first and second source points such that a possibility of collision between the traffic units sent from the first source point and the traffic units sent from the second source point is reduced.

* * * * *